US012331419B2

United States Patent
Pabst et al.

(10) Patent No.: US 12,331,419 B2
(45) Date of Patent: Jun. 17, 2025

(54) METHOD FOR CLEANING ELECTROPHORETIC COATING BATHS, AND DEVICE THEREFOR

(71) Applicant: BASF Coatings GmbH, Münster (DE)

(72) Inventors: Dominik Pabst, Münster (DE); Rolf Schulte, Münster (DE)

(73) Assignee: BASF COATINGS GMBH, Muenster (DE)

( * ) Notice: Subject to any disclaimer, the term of this patent is extended or adjusted under 35 U.S.C. 154(b) by 829 days.

(21) Appl. No.: 17/626,653

(22) PCT Filed: Jul. 15, 2020

(86) PCT No.: PCT/EP2020/070040
§ 371 (c)(1),
(2) Date: Jan. 12, 2022

(87) PCT Pub. No.: WO2021/009254
PCT Pub. Date: Jan. 21, 2021

(65) Prior Publication Data
US 2022/0243354 A1   Aug. 4, 2022

(30) Foreign Application Priority Data
Jul. 16, 2019   (EP) .................................... 19186475

(51) Int. Cl.
*C25D 13/24*   (2006.01)
*B01D 33/01*   (2006.01)
(Continued)

(52) U.S. Cl.
CPC ............. *C25D 13/24* (2013.01); *B01D 33/01* (2013.01); *B01D 33/35* (2013.01); *B01D 33/802* (2013.01);
(Continued)

(58) Field of Classification Search
CPC ........ C25D 13/22; C25D 13/24; B01D 33/01; B01D 33/35; B01D 33/802; B01D 33/804;
(Continued)

(56) References Cited

U.S. PATENT DOCUMENTS 4,956,096 A    9/1990 Arlt et al.
2017/0297034 A1   10/2017 Seery

FOREIGN PATENT DOCUMENTS

JP    H0317296 A    1/1991
JP    H06280095 A   10/1994
(Continued)

OTHER PUBLICATIONS

International Search Report for corresponding PCT/EP2020/070040 mailed Oct. 21, 2020 4 pages.

*Primary Examiner* — John Kim
(74) *Attorney, Agent, or Firm* — Armstrong Teasdale LLP

(57) ABSTRACT

Described herein is a method for cleaning an electrocoating bath in a continuous facility, where a skid connected to a conveying installation is conveyed through the electrocoating bath, and where the skid includes a filter medium; the filter medium is secured on the skid via at least one movable connecting element; the movable connecting element allows the orientation of the filter medium at the interface between electrocoating bath and air; and, after immersion of the skid into the electrocoating bath, during the conveying of the skid through the electrocoating bath, the filter medium is oriented at the interface between electrocoating bath and air and is drawn along the surface of the electrocoating bath. Also described herein is a skid for use in the cleaning method.

15 Claims, 3 Drawing Sheets

(51) Int. Cl.
- *B01D 33/35* (2006.01)
- *B01D 33/80* (2006.01)
- *B01D 35/05* (2006.01)
- *B01D 35/12* (2006.01)
- *B01D 35/14* (2006.01)
- *B01D 35/16* (2006.01)
- *B01D 36/00* (2006.01)
- *B01D 39/16* (2006.01)
- *C25D 13/22* (2006.01)

(52) U.S. Cl.
CPC ........... *B01D 33/804* (2013.01); *B01D 35/05* (2013.01); *B01D 35/12* (2013.01); *B01D 35/14* (2013.01); *B01D 35/16* (2013.01); *B01D 36/00* (2013.01); *B01D 39/16* (2013.01); *C25D 13/22* (2013.01); *B01D 2201/26* (2013.01); *B01D 2201/64* (2013.01); *B01D 2239/0407* (2013.01); *B01D 2239/0428* (2013.01)

(58) Field of Classification Search
CPC ........ B01D 35/05; B01D 35/12; B01D 35/14; B01D 35/16; B01D 36/00; B01D 39/16; B01D 2201/26; B01D 2201/64; B01D 2239/0407; B01D 2239/0428

See application file for complete search history.

(56) References Cited

FOREIGN PATENT DOCUMENTS

| | | |
|---|---|---|
| KR | 20060035423 A | 4/2006 |
| WO | 8703016 A2 | 5/1987 |

METHOD FOR CLEANING ELECTROPHORETIC COATING BATHS, AND DEVICE THEREFOR

CROSS-REFERENCE TO RELATED APPLICATIONS

This application is a U.S. National Phase Application of International Patent Application No. PCT/EP2020/070040, filed Jul. 15, 2020, which claims priority to European Patent Application No. 19186475.0, filed Jul. 16, 2019, the entire contents of which are hereby incorporated by reference herein.

The present invention relates to a method for cleaning electrocoating baths, more particularly to a method for removing disruptive substances from electrocoating baths, and to an apparatus for this purpose.

Within the field of electrodeposition coating, a distinction is made, in relation to the design of the electrocoating facilities, between continuous-travel facilities and indexed facilities. Continuous-travel facilities possess the advantage that higher throughputs are achieved, susceptibility to disruption is usually lower, and the associated capital costs are lower. Continuous-travel facilities are operated continuously, and the product to be coated is transported on racks, known as skids, through the dip-coating tank, which is filled with the electrocoating material.

Before the product for coating is introduced into the electrocoating bath, the product to be coated is cleaned thoroughly in order to avoid coating defects such as craters, for example. Craters in general are "small circular depressions in the coating that persist after drying" (DIN EN ISO 4618-2). In the narrower sense as used herein, the term "craters" is understood to refer to film defects which are distinguished by a beadlike elevation at the edge and by a platelike depression which reaches often down almost to the substrate. Disruptions of these kinds may possess diameters of up to several millimeters. They are often still visible even after topcoating on the substrate surface, such as the surface of an automobile body, and they consequently entail laborious and costly afterwork.

The tendency towards cratering increases with the gradient of the surface tension in the region of the disruption. Serving as an approximate measure of this parameter is the difference in surface tension between coating material and disruptive substance. Disruptive substances occurring include, in particular, greases or oils, silicone, and organic fluorine compounds.

Cathodic electrocoating binders are generally based on epoxy resins, and hence a surface tension of approximately 46 mN/m can be assumed. Organic fluorine compounds and silicones (especially polydialkylsiloxanes) have very much lower surface tensions, of approximately 20 mN/m. Greases and oils are situated much higher, but, at approximately 30 mN/m, still well below the electrocoating binders.

The difference between the surface tension of the coating film and the disruptive substance is one of the causes of the crater sensitivity of electrocoat materials. In practice, however, it is almost impossible to rule out completely the introduction of disruptive substances into the electrocoating bath.

Fluorine-containing compounds, for example, are used as lubricants in conveyor engineering. Silicones can be entrained in a wide variety of different ways. In metal forming, for instance, it is common to use greases or oils which contain small amounts of silicone-containing auxiliaries. In the production of the bodyshell components it is usually not possible to do without greases or oils themselves.

It is therefore critically important that the product to be coated is thoroughly degreased before being introduced into the electrocoating bath. In practice it has emerged that the degreasing of geometrically simple components is relatively untroublesome, whereas the complete degreasing of complex components such as automobile bodyshells, for example, appears to be very difficult. In this context there are numerous instances of entrainment of the disruptive substances into the electrocoating bath. These problem substances may be present in dispersion in the coating phase, and may also float on the surface of an electrocoating bath. It is therefore necessary to take measures to remove these disruptive substances.

WO 87/03016 describes a method for removing contaminants that cause surface defects from electrocoating baths, in which, in addition to the cleaning operations that are already customary, the electrocoating material is filtered without pressure through an adsorption material that adsorbs hydrophobic substances with a surface tension ≤35 mN/m. The hydrophobic substances in question are preferably homopolymers or copolymers of ethylene, propylene, but-1-ene or but-2-ene, which optionally also contain further nonpolar comonomers. Adsorption material used with particular preference comprises fibrous polypropylene in the form of a loose-fiber material. In one particularly advantageous embodiment of the invention in WO 87/03016, filter bags filled with adsorbent are installed into the coating material circuit of the electrocoating facility in such a way that the extra filtration can be readily engaged and disengaged as and when required.

WO 90/05012 proposes for the same purpose a filter having a filter cartridge which is disposed in a filter housing and which comprises a fiber packing in the form of nonwoven adsorption web.

In both cases, the filtering apparatuses are accommodated in the coating material circulation system and are traversed in flow by the bulk phase of the coating material. As a result of the slow kinetics of adsorption, the incorporation of these specific filters into the filter housing is not very effective, since the flow rate of the coating material here is very high and therefore the contact time here between disruptive substance and fiber web is only very short. A factor which reduces effectiveness is also that, because of the low density and increased hydrophobicity of the disruptive substances by comparison with the aqueous dip-coating bath, there is an accumulation of the disruptive substances at the interface between dip-coating bath and air. Because the pumps for circulating the bath draw in the coating material at the bottom of the tank, the volume flow of coating material only contains insufficient amounts of the disruptive substances, and hence the efficacy of such filter methods is likewise insufficient.

In practice, therefore, a fiber web of polypropylene with corresponding holders is placed onto the surface of the electrocoating bath. This generally takes place before the overflow pocket of the dip-coating tank, so that the vehicle bodies conveyed through the facility do not collide with the filter barrier. The advantage of this approach is that it maximizes the contact time between disruptive substances and fiber web and the filter for cleaning is engaged at the location where the disruptive substances generally come to reside.

Additionally it is possible for the surface of the electrocoating bath to be skimmed with the filter web. For this purpose, the floating filter barrier is drawn over the bath surface a number of times by, for example, two operatives who are located at opposite edges of the dip-coating tank. The disadvantage of this procedure is that production has to be interrupted, since the operative is required to work directly at the edge of the dip-coating tank and since simply on safety grounds it is necessary to interrupt the dip-coating operation. Moreover, the skimming of the surface is complicated by the conveying engineering—pendulum conveying or overhead conveying, or combined techniques. Furthermore, the working area is usually inaccessibly narrow and contaminated by coating material. Replacement of the filter also requires that the dip-coating operation be interrupted again.

With the conventional procedure, therefore, because of the need for cleaning, the advantages of higher throughputs that are associated with the use of continuous-travel facilities in electrodeposition coating are severely limited.

There is therefore a need for a reliable method for cleaning electrocoating baths, especially for removing disruptive substances from electrocoating baths, that does not have the aforesaid disadvantages.

The method ought in particular to enable the removal of disruptive substances, especially those accumulating on the surface of the electrocoating bath, without having to halt the coating facility, and therefore in ongoing operation in an effective way.

It has been possible to meet this requirement by providing a method for cleaning an electrocoating bath in a continuous-travel facility, more particularly for removing disruptive substances from an electrocoating bath in a continuous-travel facility, by conveying through the electrocoating bath a skid (1) which is connected to a conveying installation, where (a) the skid (1) comprises a filter medium (2),
(b) the filter medium (2) is secured on the skid (1) via at least one movable connecting element (3),
(c) the movable connecting element (3) allows the orientation of the filter medium (2) at the interface between electrocoating bath and air, and
(d) after immersion of the skid (1) into the electrocoating bath, during the conveying of the skid (1) through the electrocoating bath, the filter medium (2) is oriented at the interface between electrocoating bath and air and is drawn along the surface of the electrocoating bath.

This method is referred to hereinafter as the method of the invention.

Step (d) serves herein for contacting the filter medium with disruptive substances which are present on the surface of the electrocoating bath and which are picked up in the process.

The term "electrocoating bath" refers to the electrocoat material which is present in an electrocoating tank, this material being an aqueous coating material suitable for electrodeposition coating (DIN 55655-1:2014-11). "Disruptive substances" are understood herein to comprise in particular those substances which accumulate on the surface of the electrocoating bath and/or which possess a surface tension of less than 35 mN/m; preferably, both conditions apply. The surface tension of a substance may be determined in accordance with DIN EN 14370:2004-11 by the Du Noüy ring method or the Wilhelmy plate method. The movement of the ring during measurement makes the ring method only a quasi-static method. For liquids which only slowly develop the equilibrium surface tension value, the static plate method according to Wilhelmy is employed preferentially. This does not, however, mean that the disruptive substances are located exclusively on the surface of the electrocoating bath. Especially when the skid (1) is being immersed, a portion of the disruptive substances may move from the surface of the electrocoating bath into the bulk phase of the electrocoating bath, or may only part from the product being coated when in the bulk phase of the electrocoating bath. Disruptive substances are, as already described above, a common cause of film defects. "Film defects" (also referred to as film damage or film disruptions) are understood according to DIN 55945:2007-03 to be coating defects which are marked by disruptions in the coating and which are usually named according to their shape or their appearance. Disruptive substances of the kind often present in electrocoating baths frequently lead in turn to crater-like film defects, known as craters as defined above.

A "continuous-travel facility" is an electrocoating facility in which, in contrast to batchwise charging of the kind found in indexed facilities, there is continuous travel of the products to be coated through the facility.

The term "skid" (1) as used herein refers to a rack which typically serves to accommodate the product to be coated but which, in the context of the present invention, is connected to the filter medium (2) preferably in place of the product to be coated or, less preferably, in addition to said product. Secured on the skid (1) there may be a further rack which herein—if present—is considered as belonging to the skid (1). If there is a further rack secured on the skid (1), then, accordingly, connecting element (3) and filter medium (2) may also be located on it. There is preferably no further rack secured on the skid.

The term "filter medium" (2) as used herein is a common term from filtration engineering, and represents the material utilized for filtration.

The term "product to be coated" comprehends all parts intended for coating in the electrocoating bath. The products to be coated are electrically conductive, preferably metallic. They may be parts of simple form such as metal panels, for example, or else may be complex parts of three-dimensional design such as motor vehicle bodies, for example.

The "surface of the electrocoating bath" is that region of the electrocoat material that is in contact with the ambient air.

"Drawing the filter medium (2) along the surface of the electrocoating bath" is understood to mean that in this case the filter medium (2) protrudes into both the ambient air and the volume of the electrocoating bath and, with the conveying of the skid (1) through the electrocoating bath, is drawn along the surface of the electrocoating bath and in this way comes into contact with the disruptive substances located on the surface of the electrocoating bath.

A "connecting element" (3) is a component which connects the filter medium (2) to the skid (3). The connecting element (3) is movable. This means that the connecting element (3) is variable in distance between skid (1) and filter medium (2), and so the filter medium (2), during conveying through the electrocoating bath, can be drawn along the surface of the electrocoating bath in the conveying direction even when the skid (1) is immersed at different depths into the electrocoating bath. The length of the connecting element (3) must accordingly be calculated such that with the skid (1) at its maximum depth of immersion into the electrocoating bath, the filter medium (2) connected by the connecting element (3) can be drawn along the surface of the electrocoating bath. The connecting element (3) preferably comprises a folding mechanism.

As well as the advantages identified above for the method, the method of the invention is distinguished by the fact that the skid (1) which is present in any case—being used for the coating of the product to be coated—can now also be employed as a transport rack for the filter medium (2), and so the implementation of the method of the invention does not necessitate complex adaptations to the continuous-travel electrocoat facility. Instead, skids (1) fitted out in accordance with the invention can be held on standby, so that they can be deployed immediately as and when required, to replace a skid (1), fitted out with product to be coated, in ongoing operation.

During implementation of the method of the invention, the skid (1) runs through the electrocoating tank in the usual way, as is the case when the skid (1) is charged with the product to be coated.

The filter medium (2) is disposed on the skid (1) in such a way that the element (3) or elements (3) connecting the filter medium (2) to the skid (1) or to the rack mounted separately on the skid allow the filter medium (2) to be oriented at the interface between electrocoating bath and air.

Preferably, therefore, the filter medium (2) is connected, via the connecting element or elements (3), to the side of the skid (1) which points in the direction of said interface with the method of the invention as being implemented. Accordingly, this allows the continuous-travel electrocoating facility to be operated both in pendulum conveying mode or in overhead mode, or in any other mode desired.

The connection between skid (1) on the one hand and filter medium (2) on the other hand is made preferably by way of one or more foldable connecting elements (3) which open when the apparatus is operated. The opening of the preferably foldable connecting element or elements (3) between skid (1) on the one hand and filter medium (2) on the other hand may be accomplished preferably by one or more buoyancy elements (4) (or floats (4)) which are secured preferably on the filter medium (2) and/or connecting element (3). The buoyancy element or elements (4) are preferably disposed in such a way that when the skid (1) is conveyed, they lie behind the filter medium (2), thus allowing an unhindered flow against the filter medium (2). When the skid (1) is immersed into the electrocoating bath, the floats (4) hold the filter medium (2) on the surface of the electrocoating bath and orient the filter medium (2). As the depth of immersion increases, the foldable connecting element or elements (3) fold out between skid (1) on the one hand and filter medium (2) on the other hand, whereas the folding mechanism closes again when the skid (1) emerges at the end of the electrocoating tank.

In order to be able as far as possible to draw off—that is, to skim—the entire width of the bath in accordance with the invention, it is advantageous if the filter medium (2) and preferably the buoyancy element (4) as well are connected to the skid in such a way that the filter medium (2) occupies the entire width or virtually the entire width—such as, for example, at least 80%, preferably at least 90%, and more preferably at least 95% of the width—of the dip-coating tank. The filter medium (2) preferably protrudes laterally beyond the skid (1).

It will be appreciated that it is also possible, instead of one or more buoyancy elements (4), for the connecting element (3) between filter medium (2) and skid (1) or a rack mounted separately on the skid (1) to convey the filter medium (2) onto the surface of the electrocoating bath by means of a drive.

Lastly it is likewise possible for the filter medium (2) itself to function as a buoyancy element (4), by virtue of its density or enclosed cavities, and so to take on the combined function of a filter medium (2) and buoyancy element (4).

Looked at macroscopically, the filter medium (2) is preferably elongated and, when the method is being implemented, it is disposed substantially perpendicularly to the conveying direction of the skid (1) on the surface of the electrocoating bath. In principle, however, other geometries of the filter medium (2) are also possible. For example, the filter medium (2) may also have a V-shaped, U-shaped or zigzag design, in order, for example, to increase the available adsorbing surface area of the filter medium (2).

The filter medium (2) permits the cleaning of the electrocoating bath, more particularly the pick-up of the disruptive substances located on the surface of the electrocoating bath. The filter medium (2) therefore consists of a material with affinity for the typical disruptive substances. The adsorption may in principle take place chemically (chemisorption) or physically (physisorption). With preference it takes place physically.

Particularly good affinity for the disruptive substances typically present in electrocoating baths is possessed by water-repelling polymers, also referred to as hydrophobic polymers. These include, preferably, polyalkylenes, such as more particularly polyethylenes, polypropylenes, polybutylenes, and also the copolymers made from at least two monomers selected from the group consisting of ethylene, propylene, 1-butylene, and 2-butylene. Furthermore, the aforesaid polymers may comprise further nonpolar comonomers.

Because the various polymers and copolymers possess different polarities, they can also—in one preferred embodiment—be combined with one another in order to cover affinity with respect to as broad as possible a spectrum of disruptive substances.

Particularly suitable is the embodiment of the filter medium (2) in the form of a sheetlike textile product, preferably selected from the group of woven fabrics, knitted fabrics, felts or nonwovens. The embodiment of the filter medium (2) in the form of a nonwoven is especially suitable. In this case the sheetlike textile products, more particularly the nonwovens, are preferably rolled, and the rolls are used preferably in the form of the geometries referred to above.

It is, however, also possible for the above-described water-repelling polymers, in the form, for example, of a loose-fiber material, to be placed into preferably tubular nets or into tubular bags which are pervious to the electrocoat material, and for these nets or bags to be used as a filter medium (2) in the same way as the aforesaid rolls.

A further subject of the invention is a skid (1) for continuous-travel electrocoating facilities, where the skid (1) comprises a filter medium (2) which is connected to the skid (1) via one or more connecting elements (3) in such a way that during operation of the continuous-travel electrocoating facility, the filter medium is able to adopt an orientation at the interface between electrocoating bath and air. To ensure this, the connecting elements (3) are movable, as already described above with regard to the process according to the invention in which the skid can be used.

This skid (1) equipped in this way is referred to hereinafter as the skid (1) of the invention.

In one particularly preferred embodiment of the skid (1) of the invention which can be used in the method of the invention, there are one or more additional filter inserts (5) mounted on the skid (1). These filter inserts (5) preferably possess an elongate design and, in contrast to the filter medium (2) described above, are preferably disposed parallel to the conveying direction of the skid (1). During the cleaning operation, these additional filter inserts (5), likewise in contrast to the filter media (2) described above, are located primarily in the bulk phase of the electrocoating bath. Portions of the additional filter insert or inserts (5) are not located completely in the bulk phase of the electrocoating bath only during immersion and emergence. Immersion into the electrocoating bath typically goes ahead with the opening of the filter insert (5); in the immersion zone of the electrocoating tank, surface contaminants can already be picked up during transit through the surface of the electrocoating bath. The same occurs during emergence in the emergence zone of the electrocoating tank. Following complete immersion and before emergence, the additional filter inserts (5) are preferably located exclusively in the bulk phase of the electrocoating bath, where they are able to pick up contaminants.

The filter materials which can be used for the additional filter inserts (5) are likewise preferably selected from the group of materials described above for the filter medium (2).

The additional filter inserts (5) comprise the filter materials and preferably dimensionally stable housings which are pervious to the electrocoat material and that accommodate the filter materials without being pervious to them. Alternatively or additionally to the housings pervious to the electrocoat material, it is also possible to use nets and/or bags which are pervious to the electrocoat material and which accommodate the filter materials without being pervious to them.

With very particular preference the skid (1) of the invention which can be used in the method of the invention further comprises one or more measuring apparatuses (6) which are suitable for determining parameters of the electrocoating bath. The measuring apparatuses may preferably serve for analyzing the constitution of the electrocoating bath and/or for verifying the quality thereof in relation to the effectiveness of the cleaning method of the invention. For the latter purpose, these apparatuses are preferably disposed spatially after the additional filter units (5)—where the latter are present.

BRIEF DESCRIPTION OF THE DRAWINGS

The method of the invention and also the skid (1) of the invention and its mode of functioning can be elucidated in more detail by way of example with reference to the appended FIGS. 1 to 4.

Figure 1:
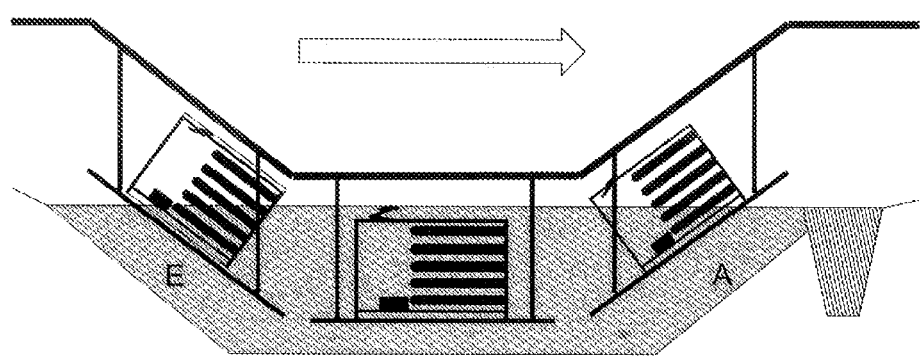
FIG. 1 shows the diagram of a continuous-travel electrocoating facility in pendulum conveying mode. The skids (1) in the immersion zone (E) and the emergence zone (A) of the electrocoating bath comprise the filter medium (2) in the folded-in state, the optional additional filter units (5), and an optional measuring apparatus (6). The middle skid (1), which is fully immersed in the electrocoating bath, shows the filter medium (2) in the folded-out state, and the optional additional filter units (5) and also an optional measuring apparatus (6) in the fully immersed state. The arrow indicates the conveying direction.
Figure 2:
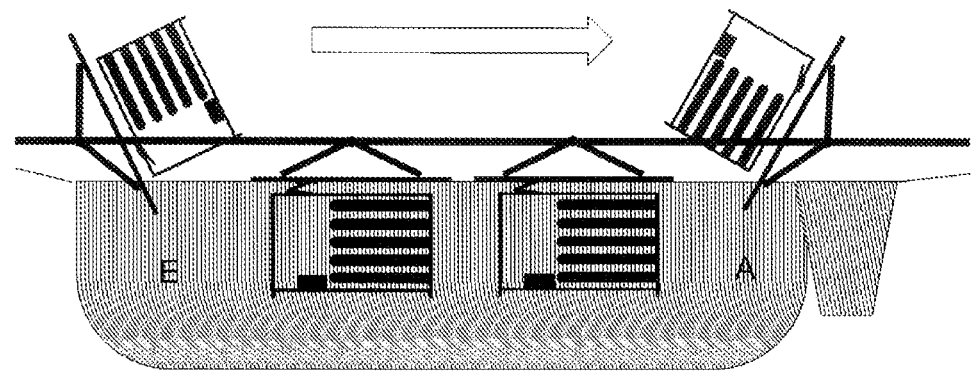
FIG. 2 shows the diagram of a continuous-travel electrocoating facility in overhead conveying mode. The skids (1) in the immersion zone (E) and the emergence zone (A) of the electrocoating bath comprise the filter medium (2) in the folded-in state, the optional additional filter units (5), and an optional measuring apparatus (6). The two middle skids (1), which are fully immersed in the electrocoating bath, show the filter medium (2) in the folded-out state, and the optional additional filter units (5) and also an optional measuring apparatus (6) in the fully immersed state. The arrow indicates the conveying direction.
Figure 3A:
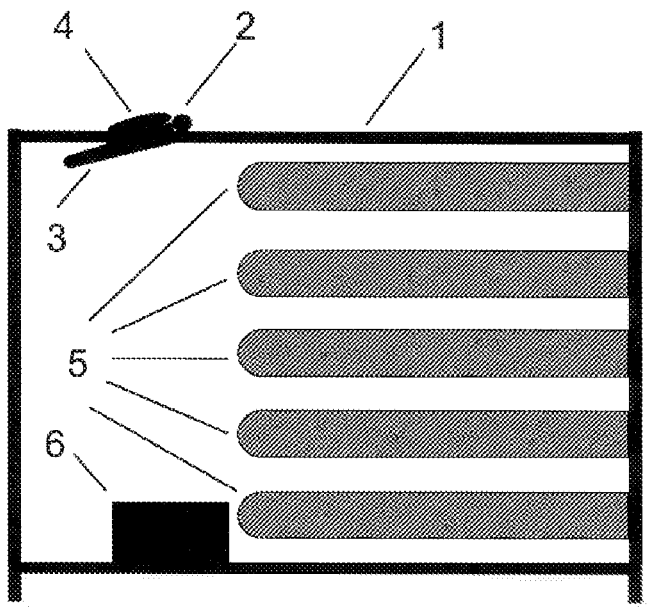
FIG. 3A, in a side view, shows the diagram of a skid (1) of the invention equipped with a folded-in filter medium (2), the optional additional filter inserts (5), and an optional measuring apparatus (6).
Figure 3B:
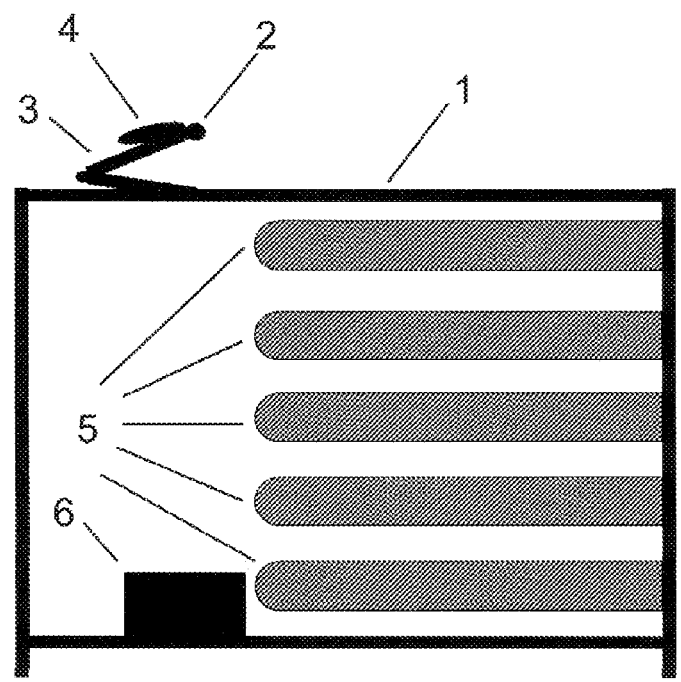
FIG. 3B, in a side view, shows the diagram of a skid (1) of the invention equipped with a folded-out filter medium (2), the optional additional filter inserts (5), and an optional measuring apparatus (6).
Figure 4:
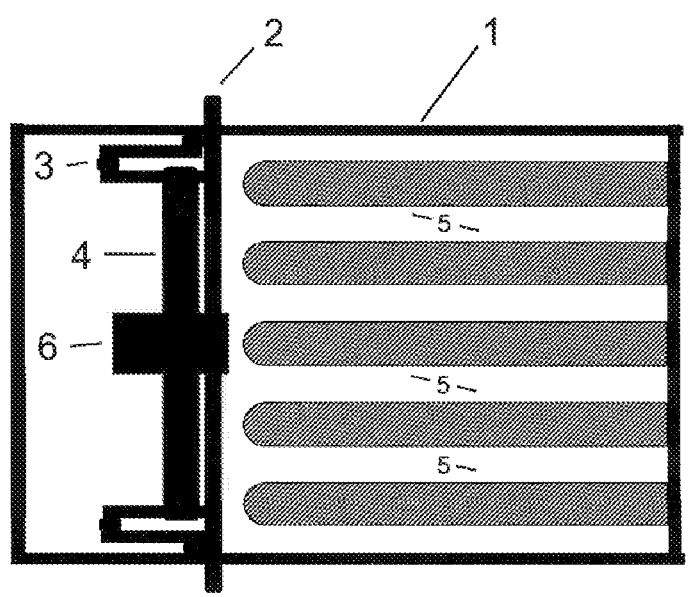
FIG. 4 shows the diagram of a skid (1) of the invention from above, equipped with a filter medium (2), the optional additional filter inserts (5), and an optional measuring apparatus (6).

The method of the invention has been found to be extremely effective and it has been possible to observe cleaning or decontamination of the electrocoating bath that goes well beyond the cleaning of the bulk phase of the electrocoating bath, by the binding of disruptive substances to the filter medium (2). In particular, after the implementation of cleaning of a contaminated electrocoating bath, the metal panels coated in the electrodeposition coating process exhibited a significantly lower number of surface defects, and especially a lower number of craters. In this way it was also possible to prevent the premature replacement of the electrocoating bath and also to prevent prolonged interruption to the coating process of the kind inevitably associated with such replacement.

LIST OF REFERENCE SIGNS (1) skid
(2) filter medium
(3) connecting element
(4) buoyancy element
(5) additional filter inserts
(6) optional measuring apparatus
(A) emergence zone
(E) immersion zone

The invention claimed is:

1. A method for cleaning an electrocoating bath in a continuous facility, where a skid connected to a conveying installation is conveyed through the electrocoating bath, and wherein
    (a) the skid comprises a filter medium,
    (b) the filter medium is secured on the skid via at least one movable connecting element,
    (c) the movable connecting element allows the orientation of the filter medium at the interface between electrocoating bath and air, and
    (d) after immersion of the skid into the electrocoating bath, during the conveying of the skid through the electrocoating bath, the filter medium is oriented at the interface between electrocoating bath and air and is drawn along the surface of the electrocoating bath.

2. The method as claimed in claim 1, wherein the skid comprises one or more buoyancy elements secured on the filter medium and/or connecting element; and/or the connecting element between filter medium and skid conveys the filter medium onto the surface of the electrocoating bath by means of a drive; and/or the filter medium acts as a buoyancy body due of its density or enclosed cavities.

3. The method as claimed in claim 1, wherein the skid comprises one or more additional filter inserts and/or a measuring apparatus.

4. The method as claimed in claim 3, wherein the additional filter insert or inserts comprise materials selected from the group consisting of water-repelling polymers, and are present in housings, nets and/or bags that are pervious to the electrocoating material but not pervious to the filter materials.

5. The method as claimed in claim 3, wherein the measuring apparatus serves to analyze the constitution of the electrocoating bath and/or verifies the effectiveness of the cleaning method.

6. The method as claimed in claim 1, wherein the filter medium comprises one or more water-repelling polymers.

7. The method as claimed in claim 6, wherein the water-repelling polymer or polymers are selected from the group consisting of polyalkylenes.

8. The method as claimed in claim 1, wherein the filter medium is disposed substantially perpendicularly to the conveying direction of the skid on the surface of the electrocoating bath and/or the filter medium occupies at least 80% of the width of a dipcoating tank.

9. The method as claimed in claim 1, wherein the filter medium is selected in the form of a sheetlike textile product selected from the group consisting of woven fabrics, knitted fabrics, felts and nonwovens.

10. The method as claimed in claim 1, wherein the filter medium physisorbs or chemisorbs substances which have accumulated at the surface of the electrocoating bath and/or which possess a surface tension of less than 35 mN/m.

11. A skid for continuous electrocoating facilities, the skid comprising a filter medium which is connected to the skid via one or more movable connecting elements in such a way that during operation of the continuous electrocoating facility the filter medium is able to adopt an orientation at the interface between electrocoating bath and air.

12. The skid as claimed in claim 11, wherein the skid comprises one or more buoyancy elements secured on the filter medium and/or connecting element.

13. The skid as claimed in claim 11, wherein the skid comprises one or more additional filter inserts and/or a measuring apparatus.

14. The skid as claimed in claim 13, wherein the measuring apparatus serves to analyze the constitution of the electrocoating bath and/or verifies the effectiveness of the cleaning method.

15. The skid as claimed in claim 11, wherein the filter medium and, where present, the additional filter inserts comprise materials which are selected from the group consisting of water-repelling polymers.

* * * * *